US012645831B2

(12) United States Patent

Wadhawan et al.

(10) Patent No.: US 12,645,831 B2

(45) Date of Patent: Jun. 2, 2026

(54) SYSTEMS AND METHODS FOR AUTOMATING SENSITIVE DATA MASKING USING GENERATIVE AI

(71) Applicant: NICE LTD., Ra'anana (IL)

(72) Inventors: Vipul Wadhawan, Bengaluru (IN); Dinesh Wadhwani, Pune (IN); Avinash Patwari, Pune (IN)

(73) Assignee: Nice Ltd. (IN)

( * ) Notice: Subject to any disclaimer, the term of this patent is extended or adjusted under 35 U.S.C. 154(b) by 0 days.

(21) Appl. No.: 18/426,623

(22) Filed: Jan. 30, 2024

(65) Prior Publication Data

US 2025/0245384 A1     Jul. 31, 2025

(51) Int. Cl.
*G06F 21/62* (2013.01)

(52) U.S. Cl.
CPC ................................. *G06F 21/6254* (2013.01)

(58) Field of Classification Search
CPC .................................................. G06F 21/6254
See application file for complete search history.

(56) References Cited

U.S. PATENT DOCUMENTS

| | | | |
|---|---|---|---|
| 10,468,026 B1 * | 11/2019 | Newman | ................. G10L 15/26 |
| 12,210,849 B1 * | 1/2025 | Coursey | ................. G06F 40/58 |
| 12,223,259 B1 * | 2/2025 | Sembium Varadarajan | ................ |
| | | | G06F 21/6254 |
| 12,341,732 B2 * | 6/2025 | Dutta | ..................... G06V 40/10 |
| 2014/0032219 A1 * | 1/2014 | Lerner | ................... G10L 25/48 |
| | | | 704/270.1 |
| 2016/0321470 A1 * | 11/2016 | Singh | ....................... G06F 21/32 |
| 2018/0054519 A1 * | 2/2018 | Mandic | ............... H04M 3/5175 |
| 2021/0158813 A1 * | 5/2021 | Sivasubramanian | ........................ |
| | | | G06Q 10/107 |
| 2024/0365081 A1 * | 10/2024 | Sporer | ................... H04R 5/033 |
| 2024/0370885 A1 * | 11/2024 | Haberman | ......... G06Q 30/0201 |
| 2024/0387030 A1 * | 11/2024 | Grantcharov | .......... G16H 20/40 |
| 2025/0014582 A1 * | 1/2025 | Bradley | .................. G10L 15/02 |
| 2025/0039283 A1 * | 1/2025 | Gandhi | ................. H04L 51/216 |
| 2025/0053273 A1 * | 2/2025 | Uva | ..................... G06Q 30/0282 |
| 2025/0086439 A1 * | 3/2025 | Paul | ..................... G06N 3/0475 |
| 2025/0103620 A1 * | 3/2025 | De Oliveira | ........... G10L 15/26 |
| 2025/0124072 A1 * | 4/2025 | Saggi | ........................ G06N 3/09 |
| 2025/0147940 A1 * | 5/2025 | Emma | ................... G06N 20/00 |
| 2025/0168465 A1 * | 5/2025 | Ingel | .................... G10L 13/033 |
| 2025/0181747 A1 * | 6/2025 | Racz | ..................... G06F 21/602 |
| 2025/0182763 A1 * | 6/2025 | Ackerman | ........... G06V 40/172 |
| 2025/0182764 A1 * | 6/2025 | Graff | ....................... G06F 40/20 |

* cited by examiner

*Primary Examiner* — Stephen T Gundry

(57)     ABSTRACT

Systems and methods for providing interaction recordings with removed personally identifiable information (PII) are disclosed, the systems and methods involving: extracting, from an interaction recording, using an automatic speech recognition engine, a timestamped recording transcript; identifying, using an artificial intelligence (AI) engine, time periods of the timestamped recording transcript which disclose PII; and removing, from the interaction recording, data present during the time periods which disclose PII, to produce a secure interaction recording.

20 Claims, 8 Drawing Sheets

100

Extracting a timestamped recording transcript from an interaction recording by using an automatic speech recognition engine     110

Identifying time periods of the timestamped recording transcript which disclose personally identifiable information (PII) by using an artificial intelligence (AI) engine     115

Removing data present during the time periods which disclose PII from the interaction recording, to produce a secure interaction recording     120

FIG. 1

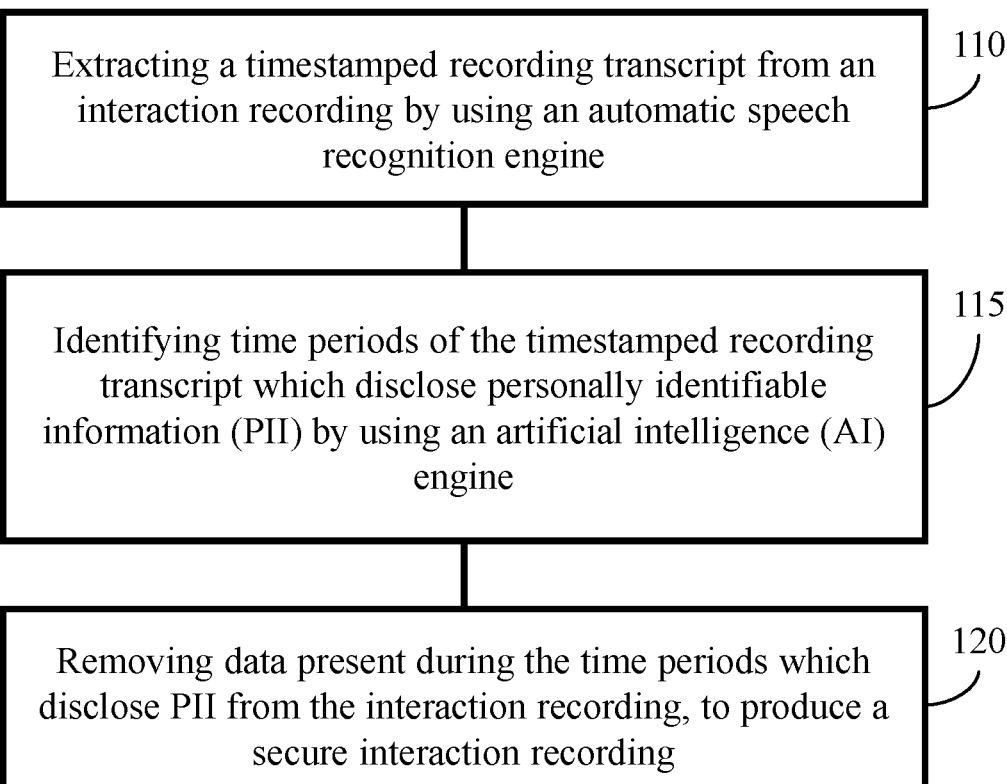

100

Extracting a timestamped recording transcript from an interaction recording by using an automatic speech recognition engine   110

Identifying time periods of the timestamped recording transcript which disclose personally identifiable information (PII) by using an artificial intelligence (AI) engine   115

Removing data present during the time periods which disclose PII from the interaction recording, to produce a secure interaction recording   120

<u>300</u>

<u>300</u>

<u>400</u>

SYSTEMS AND METHODS FOR AUTOMATING SENSITIVE DATA MASKING USING GENERATIVE AI

FIELD OF THE INVENTION

The present invention relates generally to the masking of sensitive data in files or recordings, such as of calls or contacts; for example so that recordings may be used without compromising the sensitive data.

BACKGROUND OF THE INVENTION

It may be advantageous to use recordings or data files, for example of calls or interactions at contact or call centers, in use cases such as data mining, insight generation, training, and coaching. However, without protection for sensitive information in these files, such as disclosed during interactions embodied in recordings, participants may risk becoming targets for unauthorized access, data breaches, or misuse, which may result in negative repercussions, such as legal liabilities, loss of trust, and reputational damage.

Prior solutions partially address this problem by asking contact center agents to temporarily pause recording during disclosure of sensitive information and then resume recording afterwards. However, this method can be inaccurate, insecure, and time-consuming for the agent. It may also require that portions of the interaction during which it is known sensitive information is disclosed are discarded in their entirety, rather than, for example, preserving these portions and removing only the sensitive information.

SUMMARY OF THE INVENTION

Embodiments of the present invention address issues of data privacy and confidentiality in call or contact recordings, for example, those recorded in interactions involving contact or call centers. Embodiments may improve existing technology by providing systems and methods which mask sensitive data in recordings of calls or contacts, in order that the recordings may be used without compromising the sensitive data, wherein these systems and methods are more accurate, more secure, and less time-consuming for agents than existing solutions.

Embodiments for masking sensitive data in recordings of calls or contacts are disclosed.

Embodiments of the present invention may include creating or extracting, from an interaction recording, using an automatic speech recognition engine, a timestamped recording transcript; identifying, using an artificial intelligence (AI) engine, time periods of the timestamped recording transcript which disclose personally identifiable information (PII); and removing, from the interaction recording, data present during the time periods which disclose PII, to produce a secure interaction recording.

BRIEF DESCRIPTION OF THE DRAWINGS

The subject matter regarded as the invention is particularly pointed out and distinctly claimed in the concluding portion of the specification. The invention, however, both as to organization and methods of operation, together with objects, features, and advantages thereof, may best be understood by reference to the following detailed description when read with the accompanying drawings in which:

FIG. 1 shows a method for masking sensitive data in recordings of calls or contacts according to embodiments of the invention.

DETAILED DESCRIPTION OF THE INVENTION

Figure 2:
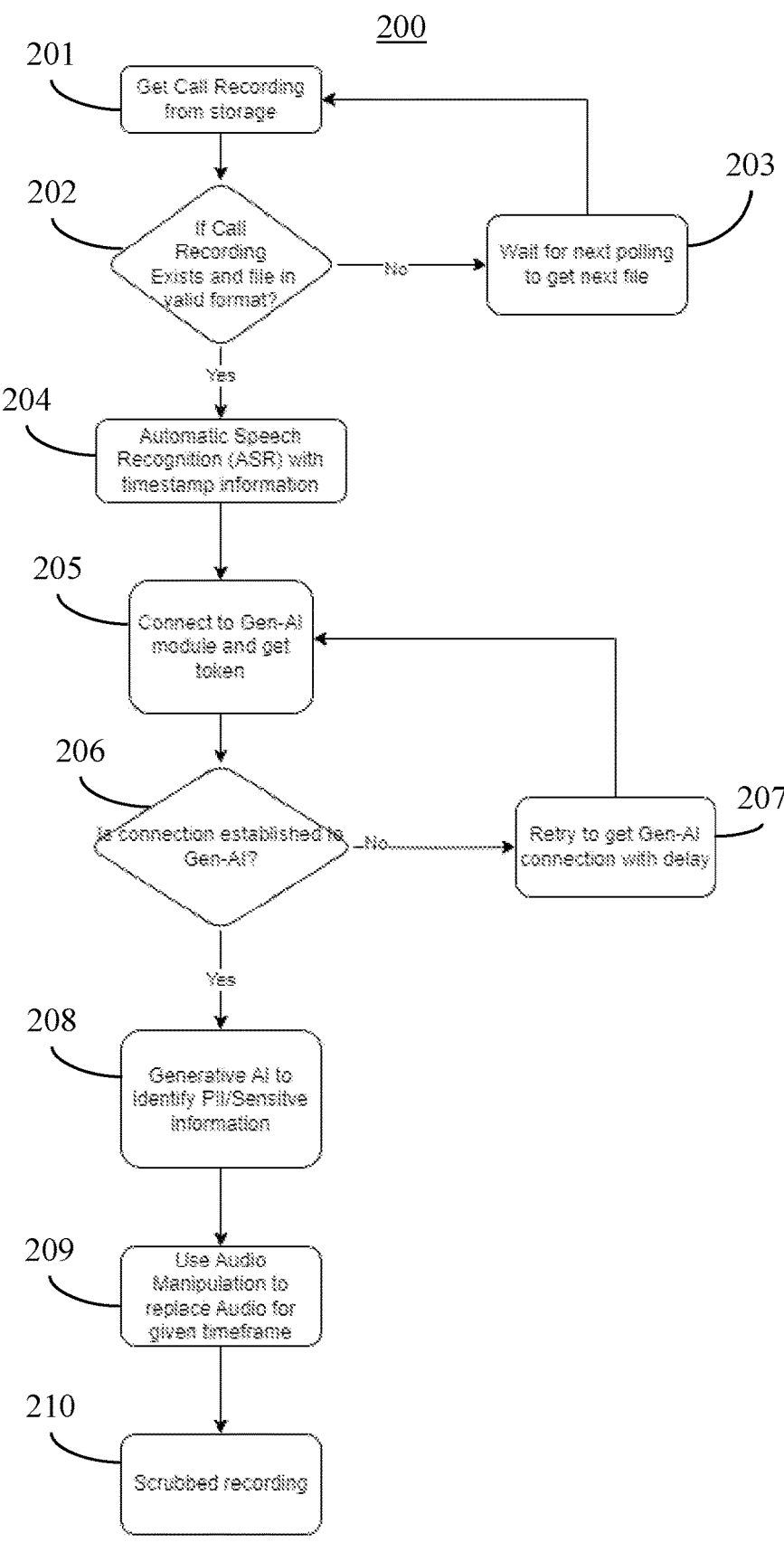
FIG. 2 shows a method for masking sensitive data in recordings of calls or contacts according to embodiments of the invention.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

As used herein, "contact center" may refer to a centralized office used for receiving or transmitting a large volume of contacts, enquiries, communications, interactions, or calls. The contacts, enquiries, communications, interactions, or calls may use telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "call center" may refer to a contact center that primarily handles telephone calls rather than other types of enquiries, communications, or interactions. Any reference to a contact center herein should be taken to be applicable to a call center, and vice versa.

As used herein, "interaction", "contact", or "call" may refer to a communication between two or more people (e.g., in the context of a contact center, an agent and a customer), typically via devices such as computers, customer devices, agent devices, etc., and may include, for example, voice telephone calls, conference calls, video recordings, face-to-face interactions (e.g., as recorded by a microphone or video camera), etc. An interaction may be recorded to generate one or more data files such as an "interaction recording" or "call recording", transcripts, metadata, etc. An interaction, or interaction recording/call recording, may also refer to data which is transferred and stored in a computer system recording the interaction and may represent an interaction, including for example voice or video recordings, data items describing the interaction or the parties, a text-based transcript of the interaction, etc. Interactions as described herein may be "computer-based interactions", e.g., one or more voice telephone calls, conference calls, video recordings/ streams of an interaction, face-to-face interactions (or recordings thereof), etc. Interactions may be computer-based if, for example, the interaction has associated data or metadata items stored or processed on a computer, the interaction is tracked or facilitated by a server, the interaction is recorded on a computer, data is extracted from the interaction, etc. Some computer-based interactions may take place via the internet, such as conference calls and web chats, whereas some computer-based interactions may take place via other networks, such as some telephone calls. Interactions may be converted into text-based interaction recordings (e.g., using automatic speech recognition).

As used herein, "agent" may refer to a contact center employee that answers incoming interactions, and may, for example, handle customer requests.

As used herein, "sensitive data", "personally identifiable information", or "PII" may refer to data or information that may enable the identification of the person which the PII describes. The PII may enable the identification of the person either alone, or in combination with other PII data. Some PII may cause harm to the person which the PII describes, if it were leaked or otherwise revealed to a different person or group of people, that may, for example, have malicious intentions. PII may include, for example, names, addresses, social security or other identification numbers, employee numbers, credit card numbers, CVV codes, account numbers, passwords, phone numbers, email addresses, etc.

As used herein, "artificial intelligence" or "AI" may refer to "intelligence" of machines or computers (e.g., as opposed to intelligence of humans). AI may be categorized in various ways and many different AI models exist. AI may, at least in a large number of cases, refer to computational models which gain intelligence through "learning", such as machine learning or deep learning, rather than being explicitly coded to execute a specific algorithm. Such models may make predictions or decisions without being explicitly programmed to do so. Learning may involve building models in response to/based on input sample or training data.

As used herein, "generative AI" may refer to deep learning AI models that may have been trained using large quantities of (often unlabeled) data. Generative AI models may generate predictions or decisions without being explicitly programmed to do so. Generative AI may, for example, include large language models, computer vision models, code completion models, or other examples as may be known in the art. Generative AI models typically include neural networks (NNs), computational constructs simulating the operation of many thousands of neurons, simple computational units, connected to each other by links. Generative AI models may be generalist, in that, in their construction, they may not be directed to a particular use. However, generalist models may, given the large quantities of data used during construction, still be effective for particular uses. In some embodiments, the utility of generative AI models may be enhanced by tuning the model with additional data, for example, as may be relevant to a particular use. In some embodiments, generative AI models may be provided with "prompts" which may provide additional data for the model and/or may deliver a request or question for the model to respond to. Generative AI models, as referred to herein, may be owned operated and/or run by a third party, such as popular generative AI models like ChatGPT, GPT5, OpenAI, Claude, Cohere, BERT, etc. Alternatively, some generative AI models may be trained for a specific use, and/or may be given data directly relevant to their intended use during training.

As used herein, "large language model" or "LLM" may refer to a type of generative AI model that is capable of understanding text or language-based prompts and generating text or language-based responses. For example, responses of LLMs may mimic the text or language-based response that a human could provide.

As used herein, "automatic speech recognition" or "ASR" may refer to systems and methods for converting or transcribing a recording of human speech into text (e.g., as stored on a computer) which represents what was said in the recording of human speech. ASR systems and methods may be implemented using AI (e.g., using machine learning or deep learning, and/or generative AI), typically using NNs.

Embodiments of the present invention may provide AI-powered transcription and recognition, that provide a proactive and effective solution to identify and handle sensitive information within call recordings.

In some embodiments, AI technology, such as AI-powered automatic speech recognition ASR, accurately transcribes audio from a recording, extracting the spoken content along with timestamps, which serves as a valuable resource for subsequent analysis. Then, AI technology, such as generative AI or large language models, may identify and categorize personally identifiable information (PII) or sensitive entities, such as names, addresses, social security numbers, or credit card number. Once identified, these PII or sensitive entities may be masked in the audio, e.g., by replacing them with a non-intrusive "beep" sound. This may ensure the privacy of the data while preserving the integrity of the conversation. Due to the use of AI-powered ASR and Generative AI this solution may be language agnostic and context aware, thus giving improved and more accurate results than existing solutions.

FIG. 1 shows a method 100 for masking sensitive data in files such as recordings of calls or contacts according to embodiments of the invention. While, as an example, files discussed herein include recordings of calls or contacts, other types of data, transcripts and recordings may be used. The method(s) of FIG. 1 and the other flowcharts disclosed herein may be configured to be carried out by a computing device or processor, for example, as described in FIGS. 5 and 6. Some embodiments of the present invention include a computing device or processor (e.g., as described in FIGS. 5 and 6) configured to carry out the method of FIG. 1 and/or the other flowcharts disclosed herein.

In operation 110, a timestamped recording transcript may be extracted from an interaction recording by using an automatic speech recognition (ASR) engine. For example, an audio recording may be converted or transcribed into text using ASR, while also returning a timestamp value of every word and/or sentence. Timestamps may encode when specific words, phrases, and/or sentences were said during the interaction (e.g., how many seconds from the start of the interaction recording). Timestamps may encode the start, end, and/or duration of the words, phrases, and/or sentences. The timestamped recording transcript may use a file format as may be known in the art for encoding a transcript with time stamps, for example, SRT, SMPTE or VTT. The file format may be the same as used for subtitles.

In operation 115, portions or time periods of the time-stamped recording transcript which disclose personally identifiable information (PII) may be identified by using an artificial intelligence (AI) engine. In some embodiments, the artificial intelligence engine is a generative artificial intelligence (Generative AI) engine. In some embodiments, the artificial intelligence engine is a large language model (LLM).

In operation 120, data present during the time periods which disclose PII may be deleted or removed from the interaction recording, or overwritten, or replaced (e.g. with a tone), to produce a secure interaction recording.

In some embodiments, the interaction recording is divided into segments before extraction of a timestamped recording transcript. An embodiment may take place in real time, such that PII is identified in a previously recorded segment, while the interaction is ongoing.

In some embodiments, the interaction is complete before execution of the process, and the interaction recording includes a recording of the entire interaction, which has taken place in the past.

In some embodiments, the interaction recordings are audio recordings including audio data, whereas in other embodiments, the interaction recordings may be video recordings including audio and image data.

Some embodiments include replacing audio data present during the time periods which disclose PII with an audible identifier indicative of removed PII. For example, audible identifiers may include a beep, silence, or with some other indicator.

FIG. 2 shows a method 200 for masking sensitive data in recordings of calls or contacts according to embodiments of the invention, which may in some embodiments be combined with operations of FIG. 1.

In operation 201, a call recording may be retrieved from storage; however, as discussed elsewhere, data other than calls may be processed in embodiments of the invention. A recording of a call/contact between a customer and an agent may be initiated by an automated caller dialer (ACD) system and then an audio recorder may start recording the media. A call may take place via and be recorded, for example, by a system as described in FIG. 6. Once the customer ends the call, the media files may be archived to a file storage system. Alternatively, the file storage system may receive portions of the call over time (e.g., as the call is ongoing). A queue or other equivalent mechanism may be used to retrieve recordings from an external system. The process may then move to operation 202.

In operation 202, it may be ascertained or validated whether a call recording exists and whether the file is in the correct format. The correct format may include any suitable audio file format as known in the art, for example, WAV, MP3, etc. If this is true, the process may move to operation 204, and if it is false, the process may move to operation 203.

In operation 203, the process may wait for a next polling to get a next file. In other words, the process may poll periodically to get any new recordings from the queue of operation 201.

In operation 204, automatic speech recognition (ASR) may be carried out on the recording. This operation may convert an audio recording into text using ASR, while also returning a timestamp value of every word and/or sentence. The output may be referred to as a timestamped or time-coded recording transcript. Timestamps may encode when/where specific words, phrases, and/or sentences are in a file, e.g. when they were said during the interaction (e.g., how many seconds from the start of the interaction recording). Timestamps may encode the start, end, and/or duration of the words, phrases, and/or sentences. The timestamped recording transcript may use a file format as may be known in the art for encoding a transcript with time stamps, for example, SRT, SMPTE or VTT. The file format may be the same as used for subtitles. The process may then move to operation 205.

In operation 205, the process may connect to a Generative AI model/module/system and/or LLM. This may represent a big data connection mechanism to connect to a generative AI System to retrieve the token after authentication. In other words, the method may in some embodiments establish a connection to the generative AI system. In some embodiments (e.g., where the generative AI system is an external or third-party system), the connection may take place, for example, via an application programming interface (API). The process may then move to operation 206.

In operation 206, it may be ascertained or validated whether a connection has been established to the generative AI System, e.g., assessing whether the token has been successfully validated. If this is true, the process may move to operation 208, and if it is false, the process may move to operation 207.

In operation 207, the process may retry to connect to the Generative AI model/module. This may be a retry mechanism in the case of an invalid token.

In operation 208, the Generative AI model/module may identify personally identifiable information (PII) and/or sensitive information. Generative AI may use a model that is trained on a diverse dataset that may include examples of sentences containing sensitive data and a variety of other language patterns. The model may learn to recognize patterns in the training dataset. It may identify associations between words, understand grammar, and learn contextual information. The model may develop a contextual understanding of language, allowing it to discern meaning and importance of words within a sentence based on the surrounding words. When a sentence is provided for analysis, the model may use its learned patterns to make predictions about the content. It may recognize certain patterns or combinations of words that are indicative of sensitive data or PII. Generative AI models may provide confidence scores or probabilities along with their predictions. These scores may indicate how certain the model is about its predictions. For example, a higher confidence score might mean the model is more confident that the input contains sensitive data. This operation may take the input transcript with timestamped word information from the previous queue. Generative AI may be used which may identify PII from given text, find its timestamp information from the given data and return the meaningful information in, for example, the following format (wherein "entity_value" may refer to section of text from the transcript which may include PII, "PII_Type" may refer to a type of PII to which this text may correspond, e.g., account number, name, etc., and "start_time" and "end_time" may represent the start and end times, respectively, of the PII in the original recording, e.g., in seconds since the beginning of the interaction):

"entity_value": "XXX", "PII_Type": "Account Number", "start_time": 11.5, "end_time": 19.2

The above represents an Array (e.g., JSON array) which may be used easily in further steps. Other data structures may be used. The process may then move to operation 209.

In operation 209, audio manipulation may be used to replace audio in time frames identified in the previous operation (e.g., instances of time between "start time" and "end_time"). Original audio may be broken down into sub parts using time stamps information from previous steps, and then the sub-parts which include sensitive data may be replaced with, for example, a beep sound, replaced with no sound, or otherwise masked, removed, or scrubbed. In this way, PII information is not accessible in the newly manipulated recording. The process may then move to operation 210.

In operation 210, the newly manipulated/scrubbed recording may be output and/or may be stored in a recording system for further purposes, such as analytics.

Figure 3A:
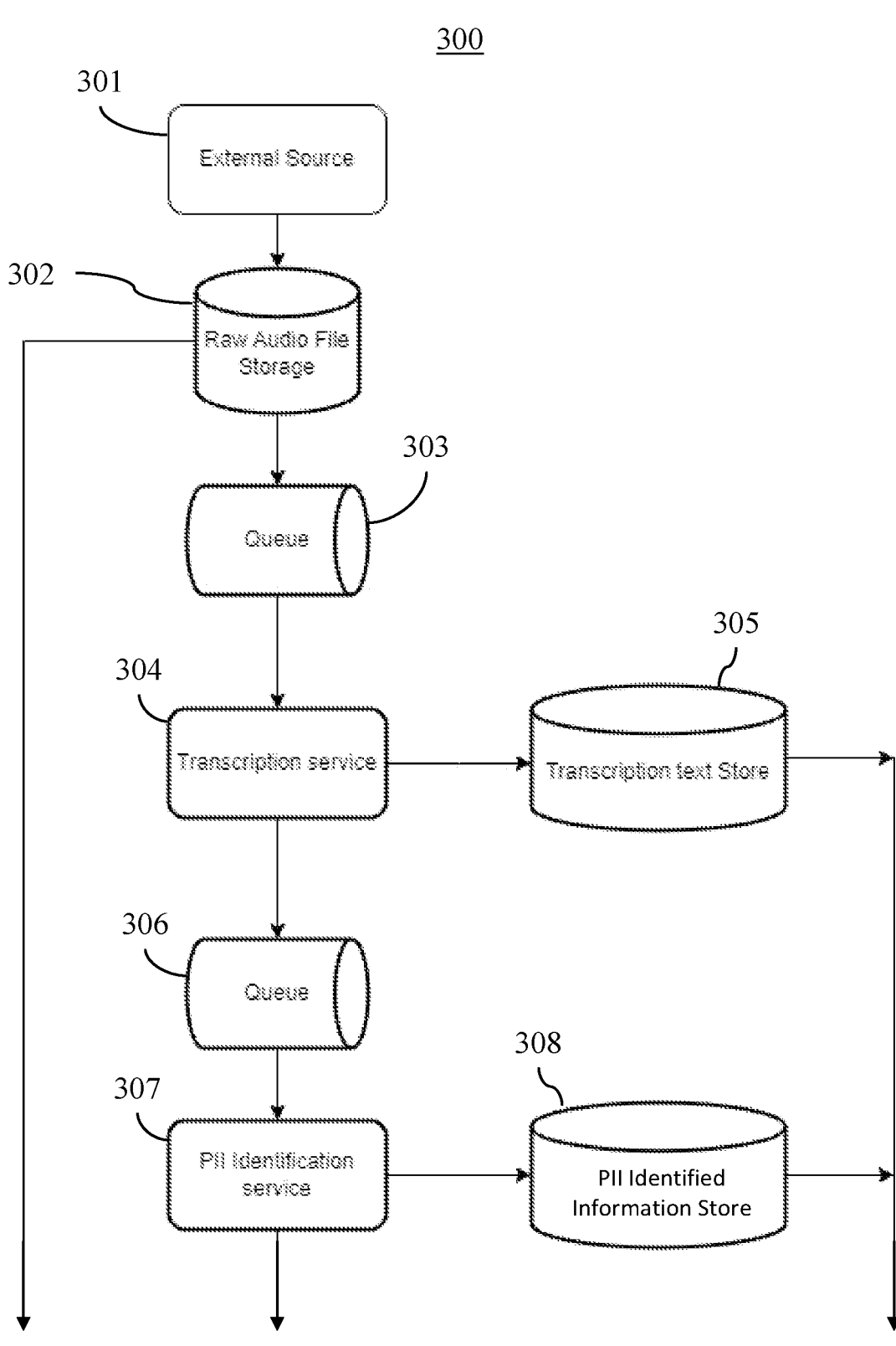
FIGS. 3A and 3B show a hardware or function block flowchart for masking sensitive data in recordings of calls or contacts according to embodiments of the invention.
Figure 3B:
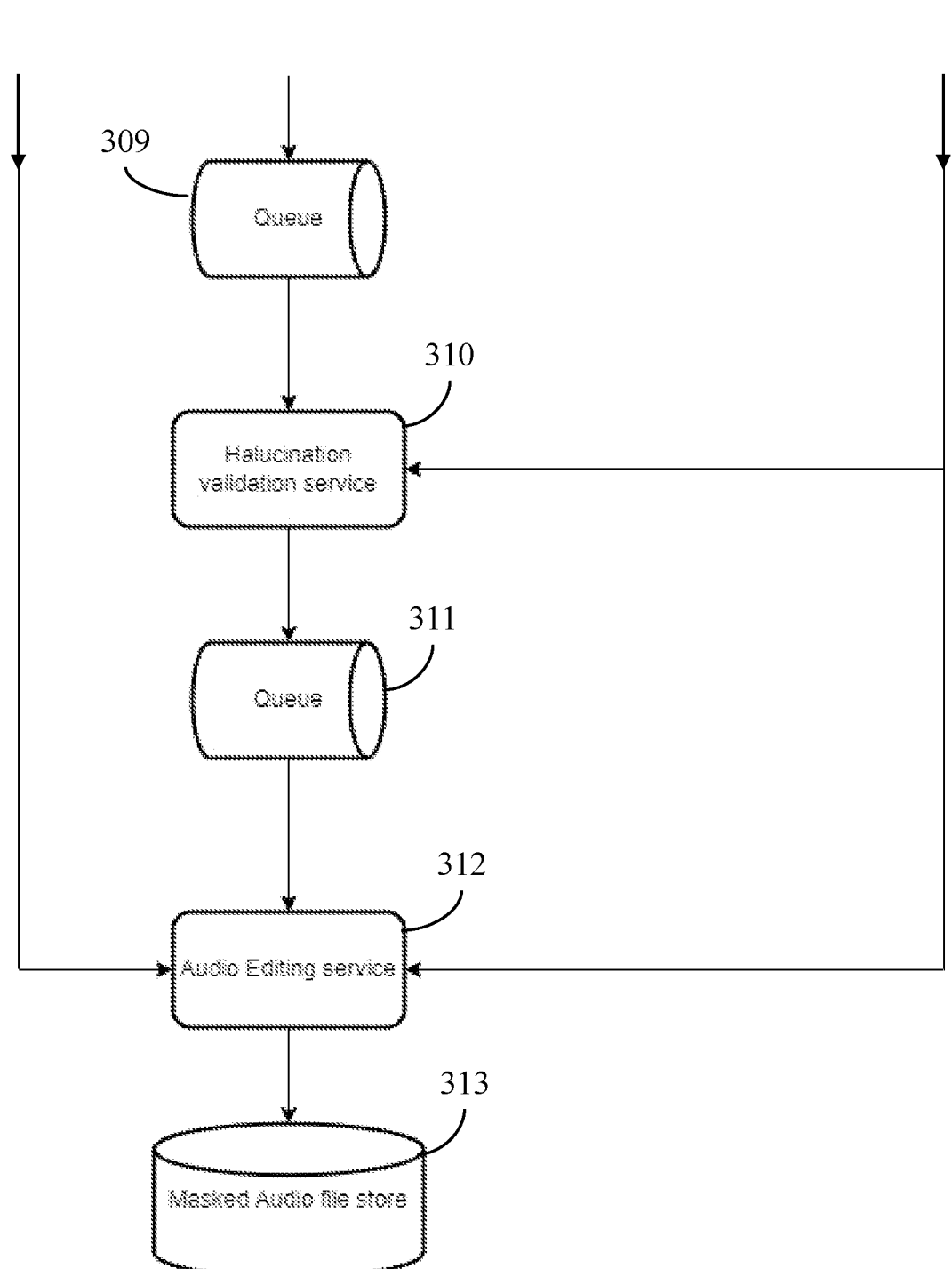

FIGS. 3A and 3B show a hardware flowchart 300 for masking sensitive data in recordings of calls or contacts according to embodiments of the invention. The elements of FIGS. 3A and 3B may be implemented on a computing device or processor, for example, as described in FIGS. 5 and 6.

Element 301 may include an external system such as an automated caller dialer (ACD) from where the call recordings may be sourced. For example, the external system may be as described in FIG. 6.

Element 302 may include audio files/call recordings stored in local computational storage for processing according to methods of the present invention. These audio files may be "raw" in that they have not yet been modified to remove personally identifiable information (PII). The raw audio files of element 302 may be passed to element 303 (including a queue) and/or element 312 (including an audio editing service).

Element 303 may include a queue mechanism where raw audio files may be fetched and/or temporally stored before processing. The raw audio files of element 303 may be passed to element 304 (including a transcription service).

Element 304 may include a transcription service that may be configured to run automatic speech recognition (ASR) to create a transcript along with timestamp information (e.g. a timestamped recording transcript) from an input raw (e.g., unmodified) audio file. Timestamps may encode when specific words, phrases, and/or sentences were said during the interaction (e.g., how many seconds from the start of the interaction recording). Timestamps may encode the start, end, and/or duration of the words, phrases, and/or sentences. The timestamped recording transcript may use a file format as may be known in the art for encoding a transcript with time stamps, for example, SRT, SMPTE or VTT. The file format may be the same as used for subtitles. The transcript along with timestamp information of element 304 may be passed to element 305 (including a computational storage) and/or element 306 (including a queue).

Element 305 may include a computational storage where files, such as transcripts, along with timestamp information may be stored. The transcript along with timestamp information of element 305 may be passed to element 310 (including a hallucination validation service) and/or element 312 (including an audio editing service). In some embodiments, element 305 may, instead, only receive the text of the transcription (e.g., encoded in a TXT file), and thus is only able to store and pass on the text to elements 310 and 312.

Element 306 may include a queue mechanism where transcripts along with timestamp information may be fetched and/or temporally stored before further processing. The transcript along with timestamp information of element 306 may be passed to element 307 (including a PII identification service).

Element 307 may include a personally identifiable information (PII) service. It may use the transcripts along with timestamp information from the queue. Generative AI may be used which will then identify PII from given text, find its timestamp information from the given data and return the meaningful information in, for example, the following format (wherein "entity_value" may refer to section of text from the transcript which may include PII, "PII_Type" may refer to a type of PII to which this text may correspond, e.g., account number, name, etc., and "start_time" and "end_time" may represent the start and end times, respectively, of the PII in the original recording, e.g., in seconds since the beginning of the interaction):

"entity_value": "XXX", "PII_Type": "Account Number", "start time": 11.5, "end_time": 19.2

Such a process may return an array (e.g., JSON array) which may be used easily by further elements. The arrays indicating timestamped PII of element 307 may be passed to element 308 (including a computational storage) and/or element 309 (including a queue).

Element 308 may include a computational storage where the arrays indicating timestamped PII may be stored. The arrays indicating timestamped PII of element 308 may be passed to element 310 (including a hallucination validation service) and/or element 312 (including an audio editing service).

Element 309 may include a queue mechanism where the arrays indicating timestamped PII may be fetched and/or temporally stored before processing. The arrays indicating timestamped PII of element 309 may be passed to element 310 (including a hallucination validation service).

Element 310 may include a hallucination validation service. The hallucination validation service may remove or edit arrays indicated in some way to indicate timestamped PII, but which are, in fact, incorrect or misleading (e.g., hallucinations). For example, they may disclose text not constituting PII, text containing PII but also containing other information that is not, or text which does not exist in the original transcript. The hallucination validation service may use generative AI to check for hallucinations. It may involve comparing received arrays (e.g., from element 309) to the received transcript (e.g., from element 305), to ensure the received arrays' reference text is actually present in the transcript. The hallucination validation service may output arrays indicating timestamped PII, with a higher degree of accuracy than provided to it (e.g., with hallucinations removed). The arrays indicating timestamped PII of element 310 may be passed to element 311 (including a queue).

Element 311 may include a queue mechanism where timestamp information (and possibly transcripts) may be fetched and/or temporally stored before further processing (e.g., masking and manipulating audio in the timestamps). The arrays indicating timestamped PII of element 311 may be passed to element 312 (including an audio editing service).

Element 312 may include an audio editing service that may be configured to carry out audio manipulation to received audio files, according to input timestamp information. Original (e.g., raw) audio may be broken down into sub parts using time stamps information we got from previous steps. Sub parts which include sensitive data may then be replaced (e.g., with a beep, with silence, or with some other indicator) or deleted. Thus, the audio editing service may produce scrubbed audio. The scrubbed audio of element 212 may be passed to element 213 (including a computer storage).

Element 313 may include scrubbed audio stored in computational storage for additional processing (e.g., analytics).

Figure 4A:
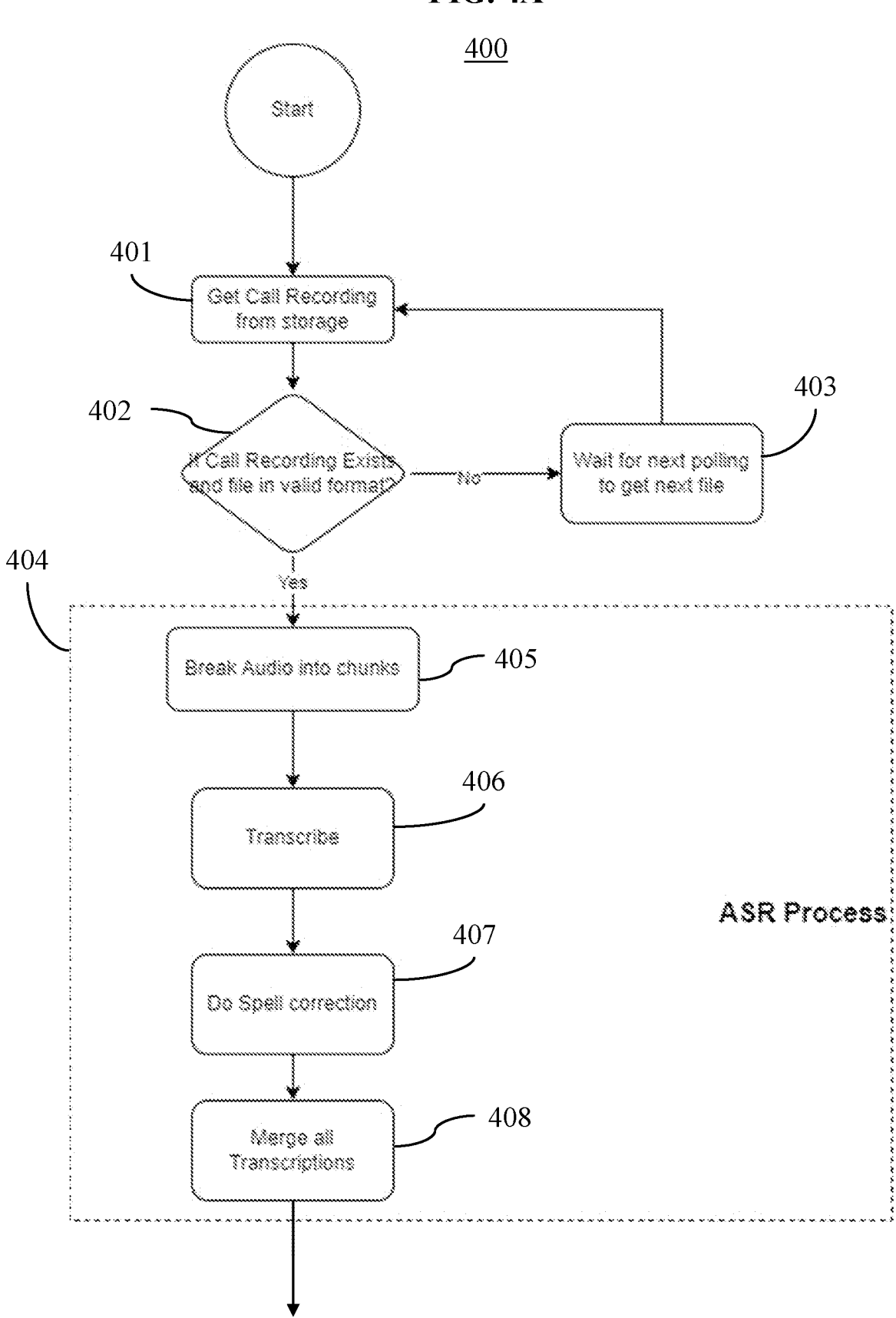
FIGS. 4A and 4B show a method for masking sensitive data in recordings of calls or contacts according to embodiments of the invention.
Figure 4B:
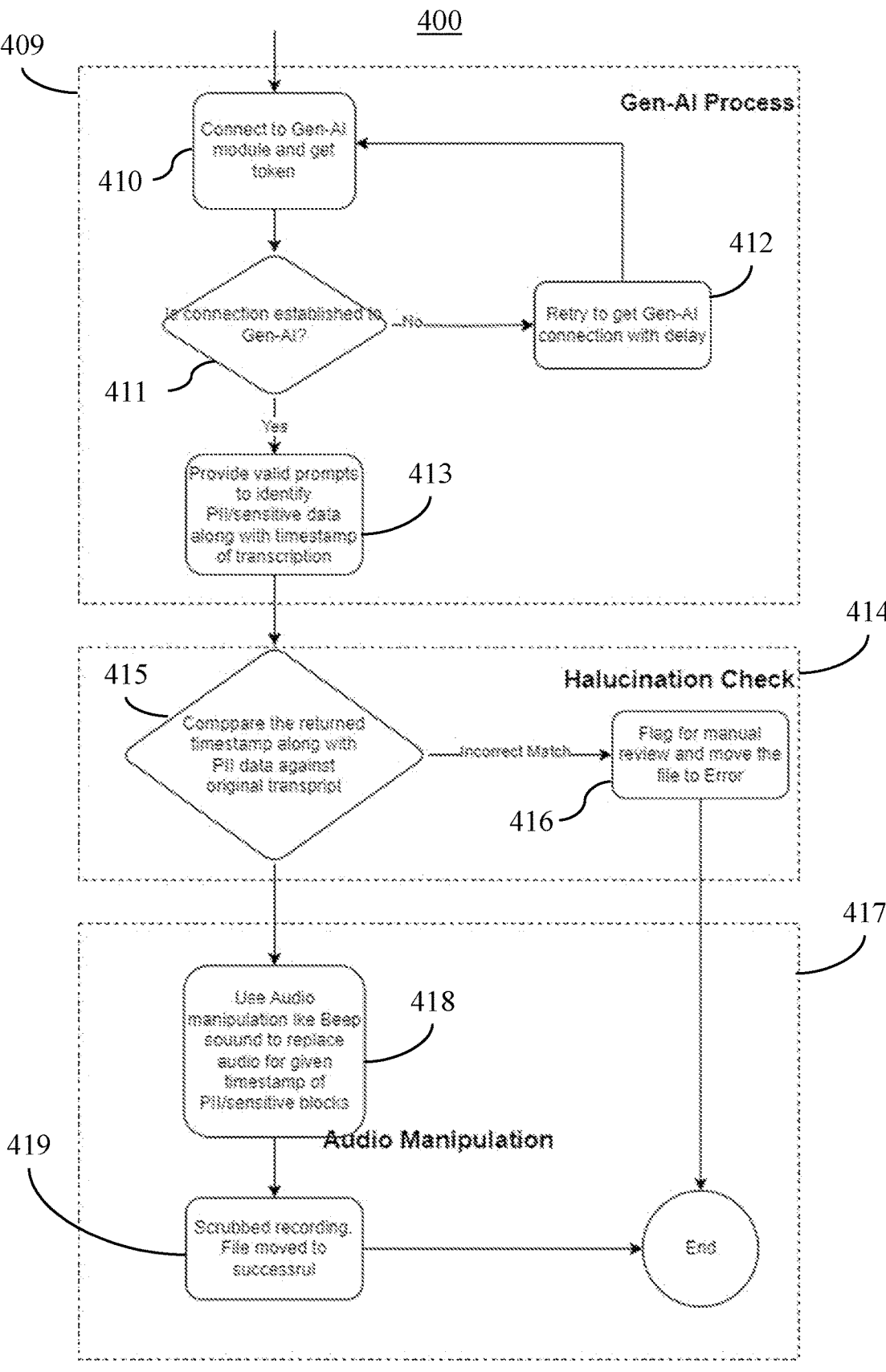

FIGS. 4A and 4B show a method 400 for masking sensitive data in recordings of calls or contacts according to embodiments of the invention; operations of FIG. 4 may be used with some or all operations of other figures shown herein.

In operation 401, a call recording may be retrieved from storage. A recording of a call/contact between a customer and an agent may be initiated by an automated caller dialer (ACD) system and an audio recorder may record the media. A call may take place via and be recorded by a system as described in FIG. 6. Once the customer ends the call, the media files may be archived to a file storage system. Alternatively, the file storage system may receive portions of the call over time (e.g., as the call is ongoing). A queue or other equivalent mechanism may be used to retrieve recordings from an external system. The process may then move to operation 402.

In operation 402, it may be ascertained or validated whether a call recording exists and whether the file is in the correct format. The correct format may include any suitable audio file format as known in the art, for example, WAV, MP3, etc. If this is true, the process may move to operation 405, and if it is false, the process may move to operation 403.

In operation 403, the process may wait for a next polling to get a next file. In other words, the process may poll periodically to get any new recordings from the queue of operation 401.

Process 404 may represent an automatic speech recognition (ASR) service, where an audio file (or call recording) may be transcribed to generate a transcript along with time stamp information. It may be a combination of various smaller processes. Process 404 may include operations 405, 406, 407, and/or 408. In some embodiments, operations 405 and 408 are used to speed up computation, whereas in other embodiments, operations 405 and 408 are not carried out. Process 404 may correspond to operation 204 of FIG. 2.

In operation 405, an audio file may be broken up into chunks or parts. For example, a five-minute-long call may be broken into ten thirty-second-long segments. Dividing a call recording into parts may aid in further processing. Dividing the audio file into parts may allow, for example, for ASR computation to be carried out in parallel improving the speed and efficiency of the ASR. The process may then move to operation 406.

In operation 406, the audio file or audio file chunks may be transcribed, in that they are converted to a transcript with timestamp information. The output may be referred to as a timestamped or timecoded recording transcript. Timestamps may encode when specific words, phrases, and/or sentences were said during the interaction (e.g., how many seconds from the start of the interaction recording). Timestamps may encode the start, end, and/or duration of the words, phrases, and/or sentences. The timestamped recording transcript may use a file format as may be known in the art for encoding a transcript with time stamps, for example, SRT, SMPTE or VTT. The file format may be the same as used for subtitles. The process may then move to operation 407.

In operation 407, a spell check may be carried out on the transcript, to remove any spelling errors that arose during the transcription of operation 406. The process may then move to operation 408.

In operation 408, the transcription chunks/parts may be merged to create one final transcript file (with timestamp information). In the example of a five-minute-long call broken into ten thirty-second-long segments, the ten transcripts corresponding to the ten segments would be combined (in order) into one transcript. The process may then move to operation 410.

Process 409 may represent a generative AI logical process which may find and mark personally identifiable information (PII) data in the given transcript (with timestamp information). Process 409 may include operations 410, 411, 412, and/or 413.

In operation 410, the process may connect to a Generative AI model/module. This may represent a connection mechanism to connect to a generative AI System to retrieve the token after authentication. In other words, the method may establish a connection to the generative AI system. The process may then move to operation 411.

In operation 411, it may be ascertained or validated whether a connection has been established to the generative AI System, e.g., assessing whether the token has been successfully validated. If this is true, the process may move to operation 413, and if it is false, the process may move to operation 412.

In operation 412, the process may retry to connect to the Generative AI model/module. This may be a retry mechanism in the case of an invalid token.

In operation 413, at least one prompt may be created for inputting, along with the timestamped transcript, into a generative AI model/module. The prompt may ask for the identification of personally identifiable information (PII). The prompt may be as described elsewhere herein. The generative AI may return data indicative of PII data in the transcript and its time stamp information. The process may then move to operation 415.

Process 414 may represent a process for checking for hallucination effects (e.g., incorrect or misleading information) in the data returned by the generative AI in operation 413. Process 414 may use generative AI to check for hallucinations, and may output data indicating timestamped PII, with a higher degree of accuracy than the data which was provided to it (e.g., without the presence of hallucinations). Process 414 may include operations 415 and 416.

In operation 415, the timestamps that are identified or said to be indicative of PII are compared to the original transcript. Each timestamp and PII word/phrase from a received array operation 413 are compared to the same period of the original transcript. If a match is found, the process may move to operation 418. If there is no match, then the supposed PII is, in fact, a hallucination, and the process may move to operation 416.

In operation 416 the invalid/hallucinated result detected in operation 415 may be discounted. Additionally or alternatively, the invalid/hallucinated result may be added to an error queue for manual review. Manual review may involve a user or administrator checking the supposed PII (with or without context) to ascertain whether the supposed PII is PII, and/or whether the supposed PII actually exists in the transcript. If the manual review results in the finding that the supposed invalid/hallucinated result was, in fact, valid and not hallucinated, the process may move to operation 418 with this result.

Process 417 may represent steps for audio manipulation, for example, where the original audio recording is modified to mask identified PII data. Process 417 may include operations 418 and 419.

In operation 418, audio manipulation may be performed for given timestamps where PII is present in the recording. Original audio may be broken down into sub parts using time stamps information we got from previous steps, and then the sub-parts which include sensitive data may be replaced with a beep sound, replaced with no sound, or otherwise masked, removed, or scrubbed. In this way, PII information is not accessible in the newly manipulated recording. The process may then move to operation 419.

In operation 419, a scrubbed audio file, e.g., an audio file with scrubbed PII, may be output and/or stored in computational storage.

Figure 5:
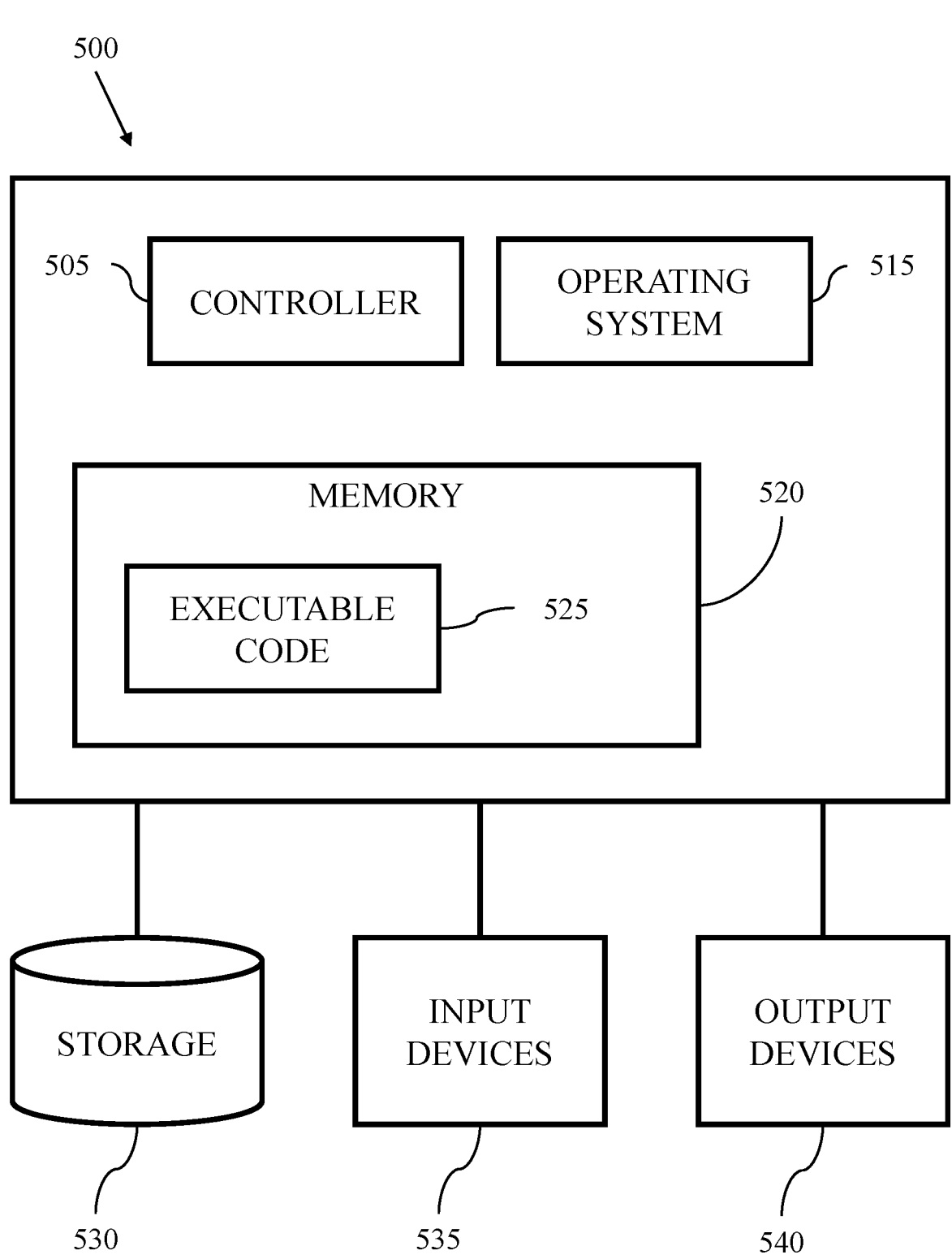
FIG. 5 shows a block diagram of an exemplary computing device which may be used with embodiments of the present invention.

FIG. 5 shows a block diagram of an exemplary computing device which may be used with embodiments of the present invention. Computing device 500 may include a controller or computer processor 505 that may be, for example, a central processing unit processor (CPU), a chip or any suitable computing device, an operating system 515, a memory 520, a storage 530, input devices 535 and output devices 540 such as a computer display or monitor displaying for example a computer desktop system.

Operating system 515 may be or may include code to perform tasks involving coordination, scheduling, arbitration, or managing operation of computing device 500, for example, scheduling execution of programs. Memory 520 may be or may include, for example, a Random Access Memory (RAM), a read only memory (ROM), a Flash memory, a volatile or non-volatile memory, or other suitable memory units or storage units. At least a portion of Memory 520 may include data storage housed online on the cloud. Memory 520 may be or may include a plurality of different memory units. Memory 520 may store, for example, instructions (e.g., code 525) to carry out methods as disclosed herein, for example, embodiments of methods associated with FIGS. 1-4B. Memory 520 may use a datastore, such as a database.

Executable code 525 may be any application, program, process, task, or script. Executable code 525 may be executed by controller 505, possibly under control of operating system 515. For example, executable code 525 may be, or may execute, one or more applications performing methods as disclosed herein, such as masking sensitive data in recordings of calls or contacts. In some embodiments, more than one computing device 500 or components of device 500 may be used. One or more processor(s) 505 may be configured to carry out embodiments of the present invention by, for example, executing software or code.

Storage 530 may be or may include, for example, a hard disk drive, a floppy disk drive, a compact disk (CD) drive, a universal serial bus (USB) device or other suitable removable and/or fixed storage unit. Data described herein may be stored in a storage 530 and may be loaded from storage 530 into a memory 520 where it may be processed by controller 505. Storage 530 may include cloud storage.

Input devices 535 may be or may include a mouse, a keyboard, a touch screen or pad or any suitable input device or combination of devices. Output devices 540 may include one or more displays, speakers and/or any other suitable output devices or combination of output devices. Any applicable input/output (I/O) devices may be connected to computing device 500, for example, a wired or wireless network interface card (NIC), a modem, printer, a universal serial bus (USB) device or external hard drive may be included in input devices 535 and/or output devices 540.

Embodiments of the invention may include one or more article(s) (e.g., memory 520 or storage 530) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 6:
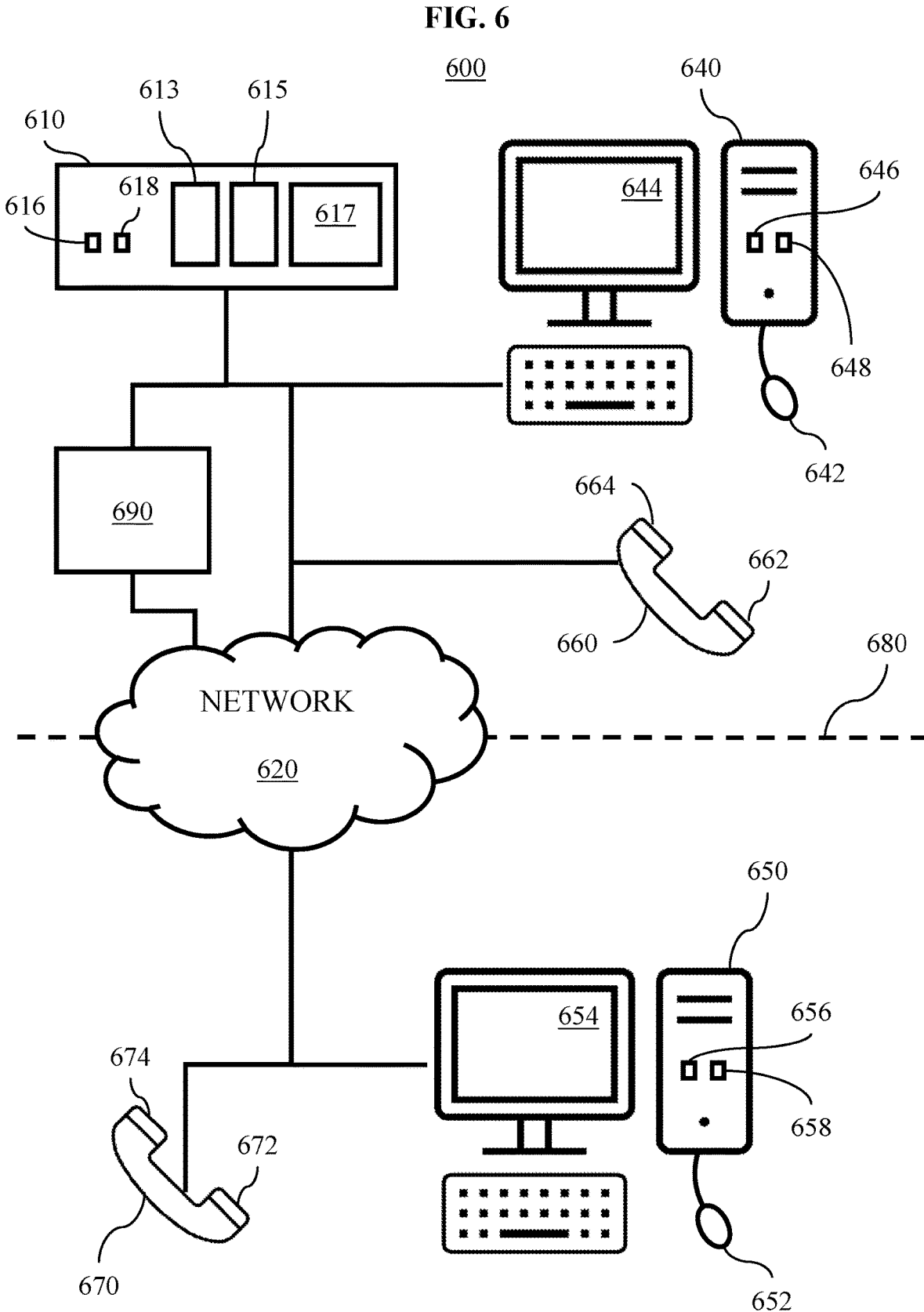
FIG. 6 is a schematic drawing of a system according to some embodiments of the invention, which may include a contact center and an agent.

FIG. 6 is a schematic drawing of a system 600 according to some embodiments of the invention, which may include a contact center and an agent. System 600 may be where a recorded interaction was carried out, recorded, and possibly stored. In some embodiments, the methods of the present invention may be carried out in a system as described by system 600 (e.g., in server 610 or agent computer 644), whereas in other embodiments, the referred to call or interaction may take place in a system as described by system 600, and the methods of present invention may use the recording thereof, but may take place elsewhere (e.g., in another computing device such as 500 of FIG. 5).

System 600 may include one or more server(s) 610, database(s) 615, telephones 660, 670, . . . , etc., and/or computer(s) 640, 650, . . . , etc., each of which may be or include computers (e.g., computer 500) or components, such as shown in FIG. 5. Any or all of system 600 devices may be connected via one or more network(s) 620. Network 620, which connects server(s) 610, computers 640 and 650, and/or telephones 660 and 670 may be any public or private network such as the Internet. Access to network 620 may be through wire line, terrestrial wireless, satellite, or other systems well known in the art.

Server(s) 610 and computers 640 and 250, may include one or more controller(s) or processor(s) 616, 646, and 656, respectively, for executing operations according to embodiments of the invention and one or more memory unit(s) 618, 648, and 658, respectively, for storing data (e.g., interactions) and/or instructions executable by the processor(s). Processor(s) 616, 646, and/or 656 may include, for example, a central processing unit (CPU), a digital signal processor (DSP), a microprocessor, a controller, a chip, a microchip, an integrated circuit (IC), or any other suitable multipurpose or specific processor or controller. Memory unit(s) 618, 648, and/or 658 may include, for example, a random-access memory (RAM), a dynamic RAM (DRAM), a flash memory, a volatile memory, a non-volatile memory, a cache memory, a buffer, a short-term memory unit, a long-term memory unit, or other suitable memory units or storage units.

Computers 640 and 650 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 640 and 650 may include one or more input devices 642 and 652, respectively, for receiving input from a user (e.g., via a pointing device, click-wheel or mouse, keys, touch screen, recorder/microphone, or other input components). Computers 640 and 650 may include one or more output devices 644 and 654 (e.g., a monitor, screen, or speaker) for displaying or conveying data to a user provided by or for server(s) 610.

Telephones 660 and 670 may be traditional telephones (e.g., landline telephones), and/or may be part of or in operation with one or more computers (e.g., smart phones and contact center phone systems), e.g., using voice over IP (VOIP) telephony. Telephones 660 and 670 may include one or more input components 662 and 672, respectively, for receiving input from a user (e.g., via a recorder/microphone, touch screen, or other input components). Telephones 660 and 670 may include one or more output devices 664 and 674 (e.g., a speaker, monitor, or screen) for conveying or displaying data (e.g., audio data from another telephone) to a user provided by or for server(s) 610.

In some embodiments, a first computer or telephone (e.g., contact center/agent computer or telephone) (e.g., 640 or 660) may be associated with a contact center and may be used by an agent, and a second computer or telephone (e.g., client computer or telephone) (e.g., 650 or 670) may be associated with or used by a client or customer. Each computer or telephone may record an input (e.g., sound of a conversation) and may transfer data indicative of this input to the network 620. Each computer or telephone may receive data indicative of an input from the network, possibly via a server 610, and may then output this data (e.g., data indictive of sound may be output using a speaker). The server 610 may be operated by the contact center. In some embodiments, all or part of the network 620 may additionally be associated with or operated by the contact center.

In one example of an interaction, an agent may ask a question into the microphone of an agent telephone, data representing this recorded sound may be transferred via a network and a server to a customer telephone, and the sound may then be output via the speaker of a customer telephone.

Server 610 may be responsible for managing interactions between agents and customers. In some embodiments, the network 620 may be responsible for recording interactions between an agent and a customer. In other embodiments, the agent may record the interaction, which may then be stored in the server.

Server 610, or another computational device configured to carry out embodiments of the invention, may use an AI engine to identify sections or time periods of a file or transcript which disclose PII, such as generative AI engine or module 690 or another AI service. In some embodiments generative AI module 690 resides remotely from server 610, e.g. in the cloud and/or accessible via a network such as network 620. In some embodiments, generative AI module 690 may be executed by or at server 610. Generative AI module 690 may be a commercially available or off-theshelf service or module, but may be other AI systems, such as a non-commercially available system trained for tasks specific to embodiments of the present invention. In some embodiments, Generative AI module 690 may be accessed via an application programming interface (API).

In some embodiments, components above dashed line 680 may be associated with a contact center, whereas components below the dashed line 680 may be associated with clients and customers.

Any computing devices of FIGS. 5 and 6 (e.g., 500, 610, 640, and 650), or their constituent parts, may be configured to carry out any methods of the present invention.

The embodiments of the present invention may be incorporated into or form part of a larger platform or a system/ecosystem, such as workforce management (WFM) platforms. The platform, system, or ecosystem may be run using the computing devices of FIGS. 5 and 6, or their constituent parts.

The invention as detailed herein may be better understood with reference to the following examples of computer code and data.

Arrays of identified PII data may have the following JSON array format according to some embodiments of the invention (wherein "entity_value" may refer to section of text from the transcript which may include PII, "PII_Type" may refer to a type of PII to which this text may correspond, e.g., account number, name, etc., and "start_time" and "end_time" may represent the start and end times, respectively, of the PII in the original recording, e.g., in seconds since the beginning of the interaction):

```
"entity_value": "XXXXX",
"PII_Type": "Account Number",
"start_time": 11.5,
"end_time": 19.2
```

The following is example Python code for transcribing calls, through automatic speech recognition (e.g., as relates to operations 204 and 406 and element 304), according to some embodiments of the invention:

```
def transcribe_call(audio_path):
    # Load the audio file
    audio1 = whisper.load_audio(audio_path)
    model = whisper.load_model('base')
    Detailed_output = whisper.transcribe(model, audio1,
language="en", verbose = False)
    jsonformattedoutput = json.dumps(Detailed_output, indent = 2,
ensure_ascii = False)
    print(jsonformattedoutput)
    return Detailed_output
```

The following is example Python code for identifying sensitive data or PII (e.g., as relates to operations 208 and 413 and element 307) according to some embodiments of the invention:

```
def identify_sensitive_data1(Text_only, filtered_data):
    recognized_text = Detailed_output[ * text']
    import os
    import openai
    from azure.identity import DefaultAzureCredential
    openai_resource = "oa-research"
```

```
    model_name = "AvinashGPT4_24K"
    default-Credential =
DefaultAzureCredential(exclude_shared_token_cache_credential=True)
    token =
default_credential.get_token("https://cognitiveservices.azure.com/.default")
    openai.api_type = "azure_ad"
    openai.api_key = token.token
    openai.api-base =
"https://{0}.openai.azure.com/".format(openai_resource)
    openai.api_version = "2023-07-01-preview"
    messagesToPass = '
    {"role":"system", "content":'I am providing you with a transcript along
with timestamps. The transcript contains sentences and words, each with
corresponding start and end times. Your task is to identify and return only
Personal Identifiable Information (PII) from the given text, excluding any
data that is not PII. The output should be a JSON array with the following
fields: "entity_value" (the identified PII), "PII_Type" (the type of PII, e.g.,
"SSN" for Social Security Number), "start_time" (the start time of the PII),
and "end_time" (the end time of the PII). Please ensure that the JSON array
includes only entries related to PII and any spelling queries specifically
related to the identified PII.'},
    {"role": "user", "content": f'{Text_only + filtered_data}"}
    ]
response = openai.ChatCompletion.create(
    engine= "gpt-4-32k",
    messages = messagesToPass,
    temperature=0,
    max_tokens=500,
    top_p=0.95)
response_string = response.choices[0].message.content
# Convert the string to a Python list of dictionaries
return response_string
```

The above code contains the following exemplary prompt for giving to or inputting to a generative AI system for identifying PII: "I am providing you with a transcript along with timestamps. The transcript contains sentences and words, each with corresponding start and end times. Your task is to identify and return only Personal Identifiable Information (PII) from the given text, excluding any data that is not PII. The output should be a JSON array with the following fields: "entity_value" (the identified PII), "PII_Type" (the type of PII, e.g., "SSN" for Social Security Number), "start_time" (the start time of the PII), and "end_time" (the end time of the PII). Please ensure that the JSON array includes only entries related to PII and any spelling queries specifically related to the identified PII.". Other prompts may be used, e.g., to the same or similar effect.

The following is an example of an original transcript according to embodiments of the present invention (some text may be recognized as containing personally identifiable information, e.g., by operations 208 and 413 or element 307):

"... advice we could offer you. No, I don't think so. I'm going to just go try another company. All right, well, we're very sorry to lose your business. Start going to have your account number. Yeah, it's three, two, five, one, two, five, six, seven, five, nine, one, four. Okay. And can you confirm your password for me? It's busy as heck, X31, the BAH and the X are all capitalized. All right. Okay. I got that. And your phone number is still 444-814-9913. I mean, it is today. Tomorrow, it'll be something different after I get a new phone. Oh, well, we'll allow you to transfer your phone number. Even if you can't or choose a new device with another company, you can still take the phone number with you. Oh, okay. That sounds awesome. And I also need to confirm your billing address. My address is 998. Lockwood drives in Koval or Kov main. Does that Kov there is 11002? Okay. Can you spell Lockwood? It's L-O-

C-K-W-O-O-D-E. Sorry, I should have said there wasn't D on the end of that. No, that's perfectly fine. All right. So, I have down the NIME canceling your plan right now. You should stop receiving charges of an ex-billing cycle. If for some reason you continue to receive charges, please contact support who will fix the problem for you. All right. Thanks for your help. Not a problem. Is there anything else I can help you with? No, that's all I needed. All right. Well, thank you for calling. And I hope you have a nice day. Yep. You too. Bye. Bye."

Given the above transcript and given timestamp information pertaining to the transcript, the following arrays (in JSON format) detailing PII and their respective timings may be output:

```
[{"entity_value": "325125675914",
"PII_Type": "Account Number",
"start_time": 11.5,
"end_time": 19.2},
{"entity_value": "busy as heck, X31",
"PII_Type": "Password",
"start_time": 26.74,
"end_time": 34.0},
{"entity_value": "444-814-9913",
"PII_Type": "Phone Number",
"start_time": 42.76,
"end_time": 46.98},
{"entity_value": "998 Lockwood Drive",
"PII_Type": "Address",
"start_time": 69.26,
"end time": 71.8},
{"entity_value": "Koval or Kov",
"PII_Type": "Address",
"start_time": 73.02,
"end_time": 74.28},
{"entity_value": "11062",
"PII_Type": "Zip code",
"start_time": 76.4,
```

-continued

```
      "end_time": 78.46},
      {"entity_value": "Lockwood",
      "PII_Type "Spelling",
      "start_time": 83.0,
      "end_time": 83.76},
      {"entity_value": "L-O-C-K-W-O-O-D-E",
      "PII_Type": "Spelling",
      "start_time": 85.4,
      "end_time": 89.84}]
```

The following is an example of a scrubbed transcript version of the text above (e.g., the output of operations 209 and 418 or element 312) according to embodiments of the present invention (with BEEPs in the place of personally identifiable information):

" . . . advice we could offer you. No, I don't think so. I'm going to just go try another company. All right, well, we're very sorry to lose your business. Start going to have your account number. Yeah, it's BEEP Okay. And can you confirm your password for me? It's BEEP are all capitalized. All right. Okay. I got that. And your phone number is still BEEP. I mean, it is today. Tomorrow, it'll be something different after I get a new phone. Oh, well, we'll allow you to transfer your phone number. Even if you can't or choose a new device with another company, you can still take the phone number with you. Oh, okay. That sounds awesome. Okay. And I also need to confirm your billing address. My address is BEEP. Does that Kov there is BEEP? Okay. Can you spell BEEP? It's BEEP. Sorry, I should have said there wasn't D on the end of that. No, that's perfectly fine. All right. So, I have down the NIME canceling your plan right now. You should stop receiving charges of an ex-billing cycle. If for some reason you continue to receive charges, please contact support who will fix the problem for you. All right. Thanks for your help. Not a problem. Is there anything else I can help you with? No, that's all I needed. All right. Well, thank you for calling. And I hope you have a nice day. Yep. You too. Bye. Bye."

Embodiments may improve existing technology by providing systems and methods which mask sensitive data in recordings of calls or contacts, in order that the recordings may be used without compromising the sensitive data, wherein these systems and methods are more accurate, more secure, and less time-consuming for agents than existing solutions.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of providing interaction recordings with removed personally identifiable information (PII), the method comprising:
   identifying, using an artificial intelligence (AI) engine, time periods of a timestamped recording transcript which disclose PII;
   comparing text within the timestamped recording transcript within the time periods indicated as disclosing PII to the timestamped recording transcript to identify incorrect PII;
   producing PII from the time periods indicated as disclosing PII, the PII not including the incorrect PII; and
   removing, from the interaction recording, data present during the time periods which disclose PII, to produce a secure interaction recording.

2. The method of claim 1, further comprising:
   extracting, from an interaction recording, using an automatic speech recognition engine, the timestamped recording transcript.

3. The method of claim 2, further comprising:
   dividing the interaction recording into segments before extraction of a timestamped recording transcript.

4. The method of claim 3, wherein the method takes place in real time, such that PII is identified in a previously recorded segment, while the interaction is ongoing.

5. The method of claim 2, wherein the interaction is complete, and the interaction recording comprises a recording of the entire interaction.

6. The method of claim 1, wherein the artificial intelligence engine is a generative artificial intelligence (Generative AI) engine.

7. The method of claim 1, wherein the artificial intelligence engine is a large language model (LLM).

8. The method of claim 1, wherein the interaction recordings are audio recordings comprising audio data.

9. The method of claim 8, further comprising:
   replacing audio data present during the time periods which disclose PII with an audible identifier indicative of removed PII.

10. The method of claim 1, wherein the interaction recordings are video recordings comprising audio and image data.

11. A system for providing interaction recordings with removed personally identifiable information (PII), the system comprising:
   a memory; and
   a processor configured to:
      identify, using an artificial intelligence (AI) engine, time periods of a timestamped recording transcript which disclose PII;
      compare text within the timestamped recording transcript within the time periods indicated as disclosing PII to the timestamped recording transcript to identify incorrect PII;
      produce PII from the time periods indicated as disclosing PII, the PII not including the incorrect PII; and
      remove, from the interaction recording, data present during the time periods which disclose PII, to produce a secure interaction recording.

12. The system of claim 11, wherein the processor is configured to:

extract, from an interaction recording, using an automatic speech recognition engine, the timestamped recording transcript.

13. The system of claim 12, wherein processor is configured to:

divide the interaction recording into segments before extraction of a timestamped recording transcript.

14. The system of claim 13, wherein the system is real-time, in that the processor is configured to identify PII in a previously recorded segment, while the interaction is ongoing.

15. The system of claim 12, wherein the interaction is complete, and the interaction recording comprises a recording of the entire interaction.

16. The system of claim 11, wherein the artificial intelligence engine is a generative artificial intelligence (Generative AI) engine.

17. The system of claim 11, wherein the artificial intelligence engine is a large language model (LLM).

18. The system of claim 11, wherein the interaction recordings are audio recordings comprising audio data.

19. The system of claim 18, further comprising:

replacing audio data present during the time periods which disclose PII with an audible identifier indicative of removed PII.

20. A method of removing personally identifiable information (PII) from files, the method comprising:

identifying, using an artificial intelligence (AI) engine, time periods of a timestamped file which include PII;

comparing text within the timestamped file within the time periods indicated as including PII to the timestamped file to identify incorrect PII;

producing PII from the time periods indicated as including PII, the PII not including the incorrect PII; and deleting, from the interaction recording, data present during the time periods which disclose PII.

* * * * *